United States Patent Office 3,194,267
Patented July 13, 1965

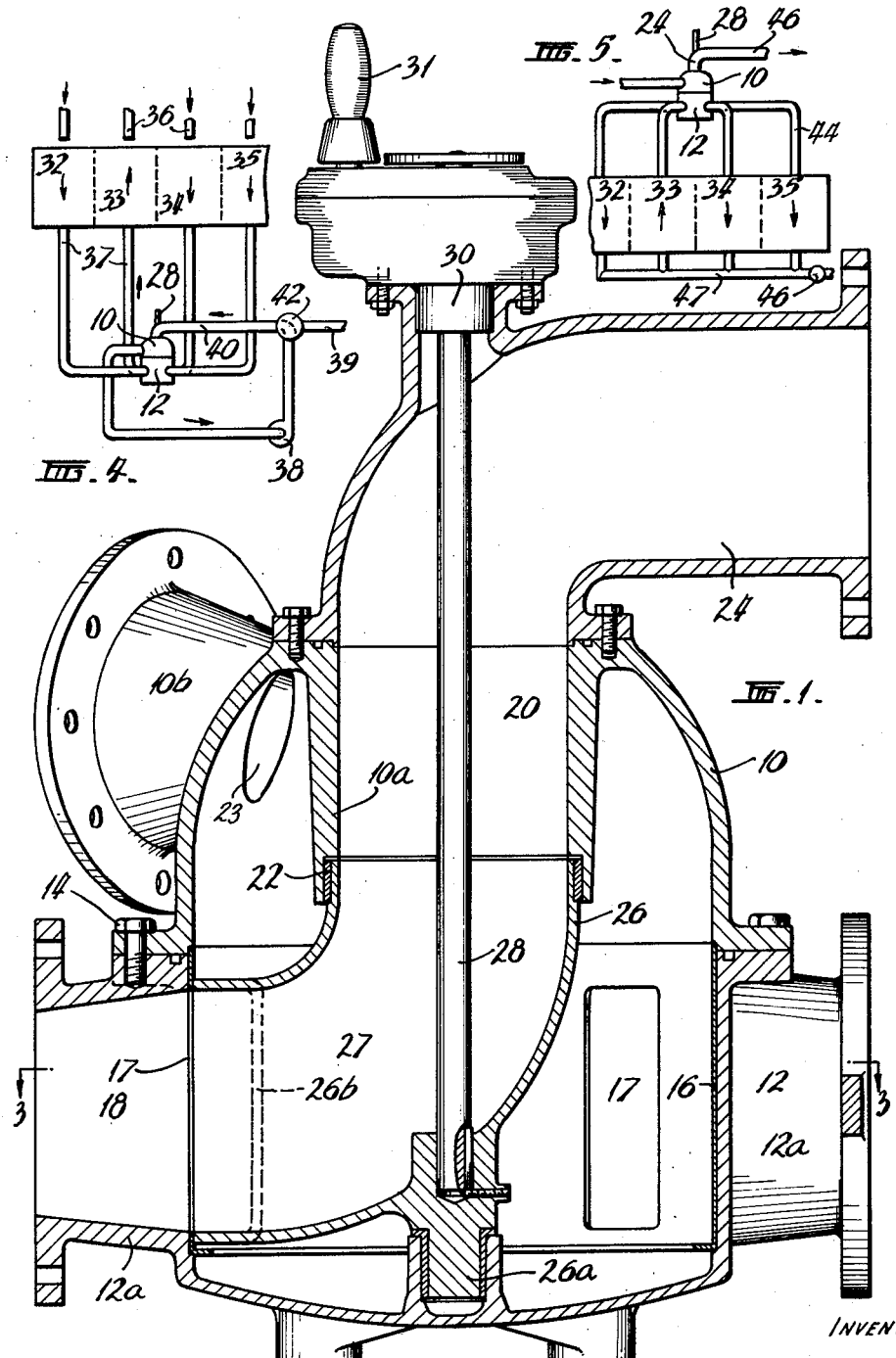

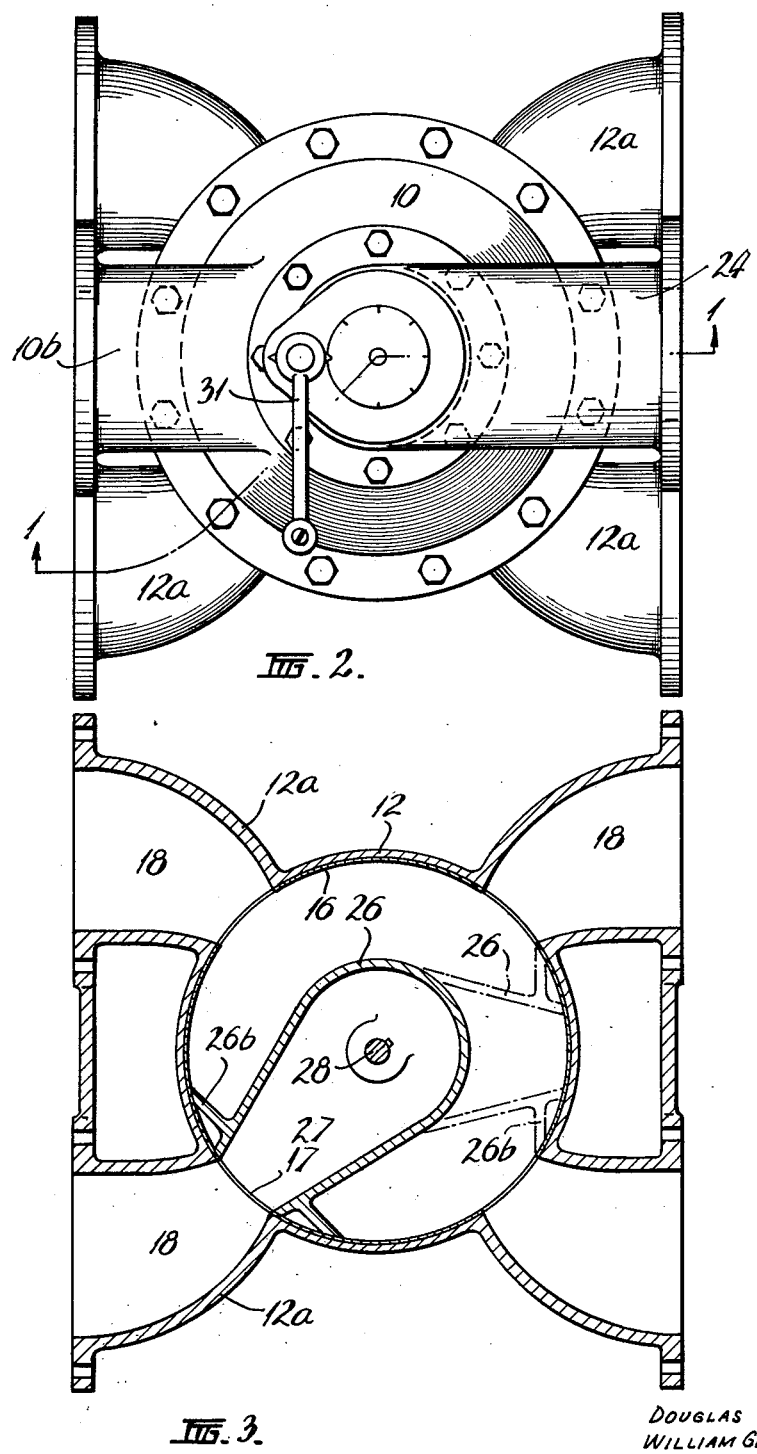

3,194,267
ROTARY CONTROL VALVE FOR FILTERS
Douglas Lyon, Syndal, Victoria, and William George Davidson, Burnley, Victoria, Australia, assignors to Filtration & Water Softening Proprietary Limited, Springvale, Victoria, Australia, a company of the State of Victoria
Filed Jan. 29, 1963, Ser. No. 254,768
Claims priority, application Australia, Feb. 2, 1962, 13,987/62
2 Claims. (Cl. 137—625.11)

This invention relates to control valves and has been devised primarily for use in water filtration plants though its use is not confined thereto.

It is usual to cleanse the beds of sand and other like filters by a backwashing operation which is carried out by directing filtered water upwardly through the bed at a rate of flow which is several times higher than the rate at which water passes downwardly through the bed during normal filtration. For this purpose it is known to utilise the filtered water passing from a plurality of filter chambers to backwash the bed in a further chamber so that when a filter plant comprises a sufficient number of separate filter chambers, each of the letter may be backwashed in turn with the combined flow of filtered water from the remaining chambers, this procedure being applicable to filters of the gravity, pressure and suction types.

For many years, we have produced pressure filters of this kind having a rotary control valve by operation of which the several filter chambers therein are backwashed in turn.

Such a valve considerably simplifies the construction and operation of a filter of this kind while also it is suitable for either manual or automatic control.

Our said prior valve comprises a chamber provided at one end thereof with a flat circular seat for a rotatable valve member formed with a radial passage which is open at each of its ends. The inner end of this radial passage is in constant communication with a wash water discharge port in the center of the seat which is also formed with a plurality of angularly spaced ports arranged at such a distance from the axis of rotation that the outer end of the said radial passage in the valve member registers with each port in turn when the valve member is turned through one complete revolution.

One disadvantage of the aforesaid control valve however is that as the valve member is pressed tightly against its seat by the pressure of liquid in the valve chamber, there is considerable frictional resistance to its rotation so that a large valve of this kind requires powerful operating mechanism. Also a typical valve of this kind occupies a considerable space and it offers a substantial resistance to the flow of water for the reason that the direction thereof is turned through an angle of 180° as it passes through the rotary valve member.

Now the object of this invention is to provide an improved control valve for the foregoing and other like purposes and by means of which the foregoing disadvantages are obviated or reduced, while another object is to provide improved filters incorporating such valves.

Accordingly, the invention includes a control valve comprising a cylindrical chamber having a plurality of angularly spaced ports in the inner periphery thereof, a radial valve member mounted within the chamber for rotation about the axis thereof and having its radially outer end disposed substantially in brushing engagement with the inner periphery of the chamber the said valve member being formed with an elbow passage having its inner end disposed axially for the inflow or outflow of the liquid from or to a position outside the chamber said elbow passage having its outer end arranged to register with each of said ports in succession when the valve member is turned, and a further passage communicating with the interior of the chamber for the inflow or outflow of the liquid thereto or therefrom.

More particularly, the open inner end of the valve member is preferably mounted in a bearing formed on, or supported by, the respective end of the chamber, while a second bearing is disposed in coaxial alignment therewith and is preferably formed on, or supported by, the opposite end of the chamber and is engaged by a coacting bearing member on the adjacent part of the valve member.

Preferably, an operating spindle extends centrally into the valve member through said axial passage in the valve chamber and is secured at its inner end to said valve member.

In order to prevent short circuiting of the water as the outer end of the valve member is moving into or out of register with each port, the said valve member is preferably provided with side wings of a width which is at least equal to the width of the ports as hereinafter more fully explained.

The invention also includes a filter comprising a plurality of filter chambers and a control valve as above defined, and wherein each filter chamber is connected to a corresponding one of said ports in the control valve and constructed and arranged whereby any selected one of the filter chambers may be backwashed when said radial valve member is moved into register with the corresponding port in the control valve.

In the accompanying drawings which show a preferred construction of valve according to the invention:

FIG. 1 is a view in vertical section of the valve and is taken on the line 1—1 of FIG. 2.

FIG. 2 is a view in plan.

FIG. 3 is a view in sectional plan taken on the line 3—3 of FIG. 1.

FIG. 4 is a diagram showing the valve as used in a multi-chamber suction filter, and FIG. 5 is a diagram similar to FIG. 4 showing the valve as used in a multi-chamber pressure filter.

The four-way control valve shown in the drawings comprises a vertically arranged and generally cylindrical chamber of appropriate size for the required purpose and which in one practical example has a diameter of 18 inches.

The said chamber comprises coaxial upper and lower body sections 10 and 12 respectively provided with mating flanges which are detachably secured together by bolts 14 to form a watertight joint therebetween. The lower body section is integrally closed at its lower end which is formed with spaced projections to serve as supporting feet. This lower body member is fitted internally with a cylindrical liner 16 formed with four vertically elongated rectangular ports 17 arranged at angular spacings of 90°. These ports which have their upper and lower ends disposed in common transverse planes register with the similarly shaped inner ends of passages 18 formed in the lower body section and in outward extensions 12a formed thereon and the outer ends of these passages are preferably of circular shape.

The four outwardly projecting extensions 12a which are flanged at their outer ends, are preferably curved when viewed in plan, as in FIGS. 2 and 3 so that the outer end of each passage 18 is disposed in coaxial alignment with the outer end of a passage disposed at the opposite side of the body and parallel to the common axis of the outer ends of the remaining two passages.

The upper end of the upper body section 10 is formed axially with a large diameter hole 20 which extends through an integral tubular member 10a which depends axially from the top of the said upper body section. This tubular member terminates above the lower end of said upper body section and its lower end is counterbored and fitted with a bearing ring 22.

A passage 23 for the inflow or outflow of liquid communicates laterally with the upper end of the interior of the upper body section which is formed with a flanged outward extension 10b through which this passage extends.

An elbow 24 is fitted to the top of the upper body section so as to register with the axial passage 20 therein while its outer end projects horizontally above the chamber and is flanged for connection to an inlet or discharge pipe.

A rotary valve member 26 of hollow elbow shape is mounted within the valve chamber so as to turn about the vertical axis thereof, and its upper end is reduced in diameter to fit neatly within the bearing ring 22 in the depending tubular member 10a while its outer end is disposed close to the inner periphery of the cylindrical liner 16 so as to be substantially in brushing engagement therewith. The bottom of the valve member is formed with an axial pivot pin 26a which is received within a bearing projecting upwardly from the closed lower end of the lower body section.

The passage 27 in the valve member is of circular shape in cross-section at its upper end which is in constant communication with the axial passage 20 in the upper body section while the lower and outer end of the elbow passage corresponds in shape and size to the aforesaid rectangular ports 17 in the liner 16 and is disposed between the same transverse planes so that by rotating the valve member about the axis of its bearings, the outer end of this passage may be moved into register with any one of the ports.

In order to prevent the flow of liquid from the interior of the valve chamber into the outer end of the valve passage 27 as the latter is moving into or out of register with each port 17 the said outer end of the valve member 26 is provided with laterally projecting integral wings 26b so that each port is closed by the leading wing before the passage 26 in the valve member communicates with that port while similarly the trailing wing covers the port until the valve passage moves completely out of register therewith, it being understood that these wings also are disposed substantially in brushing engagement with the liner. It will be apparent that for this purpose the width of each wing as measured in the circumferential direction of the chamber is at least equal to the width of the ports therein while also the distance between the outer edges of the two wings is such that when the valve member is arranged in a neutral position i.e. midway between two adjacent ports as shown in broken lines in FIG. 3, the said ports are not excesively if at all obstructed by the said wings. However as the rate of filtration is substantially less than the backwash rate as hereinafter explained the ports may without disadvantage be partly obstructed under these conditions.

In order to turn the valve member, an operating spindle 28 passes downwardly through a sealed bearing 30 in the top of the elbow 24 and axially downwards through the axial passage 20 in the upper section 10 and into a socket in the bottom of the valve member to which it is secured by a key or otherwise. The projecting upper end of the spindle is connected by gearing or otherwise to a hand crank 31 or to a driving motor or the like (not shown).

FIG. 4 is a diagram showing the use of the control valve in a suction filter comprising four filter chambers designated 32, 33, 34 and 35 to which the liquid to be filtered is supplied for example through pipes 36. Filtered water is discharged from the lower end of each chamber through a pipe 27 each of which is connected to the outer end of one of the tubular extensions 12a of the lower body section. A suction pump 38 is arranged to withdraw liquid from the filter body through the tubular extension 10b of the upper section thereof and the delivery pipe of the pump communicates with a service pipe 39 and with a pipe 40 which is connected to the elbow 24 on the top of the valve body. A valve 42 is provided to connect the pump discharge to either one of the pipes 39 and 40 as required.

During normal operation of the filter the valve 42 is arranged to connect the pump discharge to the service pipe while the rotary valve member 26 is arranged in a neutral position such that all of the ports 17 are unobstructed. Thus filtered water passes into the interior of the valve chamber from the bottom of each filter chamber and is discharged through the pump suction pipe and the pump to the service pipe 39.

In order to backwash any one of the filter chambers say the chamber 33, the valve member 26 is turned until its outer end registers with the port 17 corresponding to that chamber. In addition the supply of unfiltered water to the top of that chamber is cut off and the valve 42 is arranged to connect the pump discharge pipe to the elbow 24.

In these circumstances filtered water from the chambers 32, 34 and 35 passes into the interior of the valve body from which it is withdrawn by the pump and discharged thereby through the pipe 40, elbow 24 and the passage 27 in the rotary valve member 26 into the port 17 which communicates with the bottom of filter chamber 33. Thus the combined flow of filtered water from all but one of the filter chambers is utilised to backwash the remaining chamber and it will be evident that if required further filter chambers may be provided so as to increase the backwash velocity without increasing the velocity of downward filtration. A generally similar arrangement may be used for a multi-chamber gravity filter through the suction pump 38 is then omitted.

In the case of a multi-chamber pressure filter (see FIG. 5) the control valve is preferably arranged centrally above the filter chambers 32-35 and the upper end of each of the latter is connected by a pipe 44 to a corresponding one of the passages 18 of the valve while the tubular extension 10b is connected to the source of water to be filtered and the elbow 24 is connected to a wash water discharge pipe 45.

During normal operation the valve member 26 is disposed in a neutral position while in order to backwash any filter chamber a valve 46 in a common filtrate discharge pipe 47 is closed and the valve member 26 of the control valve is moved into register with the port 17 for the filter to be cleansed. Thus in the illustrated condition the combined flow of filtered water from the filter chambers 32, 34 and 35 passes upwardly through the selected chamber 33 and then through the valve member 26 to the wash water discharge pipe 46.

In either case, it will be evident that by turning the valve member through one complete revolution, each filter bed is backwashed in turn with the combined flow of filtered water from the remaining chambers.

A rotary valve as above described is capable of being considerably reduced in diameter as compared with an equivalent valve of the aforesaid flat seat type and the power required to operate it is also lower. Also the valve, particularly in the larger sizes, is more convenient and less expensive to produce and has a better hydraulic efficiency for the reason that the water in passing through the valve is smoothly turned through an angle of 90° only, whereas in the aforesaid prior valve, it is turned more sharply through an angle of 180°.

We claim:

1. A control valve comprising two coaxial body sections forming a cylindrical chamber, means securing said body sections together intermediate the ends of said chamber, one of said body sections having a plurality of angularly spaced ports in the inner periphery thereof, a radial valve member mounted within the chamber for rotation about the axis thereof, means for turning said valve member, said valve member having its radially outer end disposed substantially in brushing engagement with the inner periphery of the chamber, the said valve member being formed with an elbow passage, means connected to said valve member about the inner end of said elbow passage for the inflow or outflow of liquid from or to a position outside the chamber, said elbow passage having its outer end arranged to register with each of said ports in succession when the valve member is turned, laterally projecting side wings on the outer end of the radial valve member and disposed in substantial brushing engagement with the inner periphery of the chamber, said wings having a width such that they cover each port as said elbow passage is moving into and out of register therewith, and the other one of said body sections being formed with a further passage which communicates with the interior of the chamber for the inflow or outflow of liquid thereto or therefrom.

2. A control valve comprising two coaxial body sections forming a cylindrical chamber, means securing said body sections together intermediate the ends of said chamber, one of said body sections having a plurality of angularly spaced ports in the inner periphery thereof, a radial valve member mounted within the chamber for rotation about the axis thereof, means for turning said valve member, said valve member having its radially outer end disposed substantially in brushing engagement with the inner periphery of the chamber, the said valve member being formed with an elbow passage, a tubular member connected to said valve member about the inner end of said elbow passage for the inflow or outflow of liquid from or to a position outside the chamber, said elbow passage having its outer end arranged to register with each of said ports in succession when the valve member is turned, a rotatable spindle extending axially into the valve member through said tubular member and having its inner end secured to the valve member thereby to turn the latter, a sealed bearing for said spindle, and the other one of said body sections being formed with a further passage which communicates with the interior of the chamber for the inflow or outflow of liquid thereto or therefrom.

References Cited by the Examiner

UNITED STATES PATENTS

| 2,199,891 | 5/40 | Mortin | 210—275 XR |
| 2,821,998 | 2/58 | Mayhew | 137—625.11 |
| 2,845,787 | 8/58 | Fick | 137—625.43 X |
| 2,996,083 | 8/61 | Huska | 137—625.11 |

FOREIGN PATENTS

| 203,383 | 5/56 | Australia. |
| 208,919 | 11/55 | Australia. |

M. CARY NELSON, *Primary Examiner.*

FRANK W. LUTTMER, MARTIN P. SCHWADRON,
*Examiners.*